US009260646B2

(12) United States Patent
Chowdhury et al.

(10) Patent No.: US 9,260,646 B2
(45) Date of Patent: Feb. 16, 2016

(54) POLYMER MATRICES FUNCTIONALIZED WITH CARBON-CONTAINING SPECIES FOR ENHANCED THERMAL CONDUCTIVITY

(71) Applicant: Laird Technologies, Inc., Earth City, MO (US)

(72) Inventors: Sumana Roy Chowdhury, Karnataka (IN); Padma Priya Sudharshana, Karnataka (IN); Srinivasan Duraiswamy, Karnataka (IN)

(73) Assignee: Laird Technologies, Inc., Earth City, MO (US)

( * ) Notice: Subject to any disclaimer, the term of this patent is extended or adjusted under 35 U.S.C. 154(b) by 0 days.

(21) Appl. No.: 14/493,797

(22) Filed: Sep. 23, 2014

(65) Prior Publication Data

US 2015/0014577 A1    Jan. 15, 2015

Related U.S. Application Data

(63) Continuation of application No. PCT/US2013/034795, filed on Apr. 1, 2013.

(51) Int. Cl.
*C09K 5/14* (2006.01)
*C08K 9/06* (2006.01)
*C08K 5/5419* (2006.01)

(52) U.S. Cl.
CPC ... *C09K 5/14* (2013.01); *C08K 9/06* (2013.01); *C08K 5/5419* (2013.01)

(58) Field of Classification Search
None
See application file for complete search history.

(56) References Cited

U.S. PATENT DOCUMENTS

| 3,867,333 | A | 2/1975 | Vanderbilt |
| 8,048,940 | B2 | 11/2011 | Lukehart et al. |
| 2007/0259994 | A1 | 11/2007 | Tour et al. |
| 2007/0298669 | A1 | 12/2007 | Barrera et al. |
| 2009/0082500 | A1 | 3/2009 | Chiang et al. |
| 2010/0260931 | A1 | 10/2010 | Malecki et al. |
| 2011/0178224 | A1 | 7/2011 | Pan et al. |
| 2011/0224376 | A1 | 9/2011 | Zhai et al. |
| 2012/0065311 | A1 | 3/2012 | Chakraborty et al. |

FOREIGN PATENT DOCUMENTS

| CN | 102102001 | 6/2011 |
| CN | 102153877 | 8/2011 |
| KR | 1020050034839 | 4/2005 |
| KR | 1020100032811 | 3/2010 |
| WO | WO 2004/041915 | 5/2004 |

(Continued)

OTHER PUBLICATIONS

Hu et al. "Enhanced dispersion of carbon nanotube in silicone rubber assisted by graphene" Polymer 53, 2012, 3378-3385.*

(Continued)

*Primary Examiner* — Robert S Loewe
(74) *Attorney, Agent, or Firm* — Harness, Dickey & Pierce, P.L.C.

(57) ABSTRACT

Disclosed are thermally conductive composites that include a polymer matrix functionalized with a carbon-containing species covalently coupled with the polymer matrix. Also disclosed are methods that generally include functionalizing a carbon-containing species and incorporating the functionalized carbon-containing species into the polymer, such that the carbon-containing species are covalently bonded to the polymer matrix via a coupling agent.

25 Claims, 6 Drawing Sheets

(56) References Cited

FOREIGN PATENT DOCUMENTS

| WO | WO2008/012196 | 1/2008 |
|----|---------------|--------|
| WO | WO 2011/082064 | 7/2011 |
| WO | WO 2013/169413 | 11/2013 |

OTHER PUBLICATIONS

Bag et al. "Chemical functionalization of carbon nanotubes with 3-methacryloxypropyltrimethoxysilane (3-MPTS)" Smart Mater. Struct. 13, 2004, 1263-1267.*

Verdejo et al. "Functionalized graphene sheet fileed silicone foam nanocomposites" J. Mater. Chem. 2008, 18, 2221-2226.*

Cai et al. "Recent advance in functionalized graphene/polymer nanocomposites" J. Mater. Chem. 2010, 20, 7906-7915.*

Liu et al. "Synthesis, characterization and optical limiting property of covalently oligothiophene-functionalized graphene material" Carbon, 47, 2009, 3113-3121.*

Fang et al. "Single-layer graphene nanosheets with controlled grafting of polymer chains" J. Mater. Chem. 2010, 20, 1982-1992.*

Fang et al. "Covalent polymer functionalization of graphene nanosheets and mechanical properties of composites" J. Mater. Chem. 2009, 19, 7098-7105.*

Kuilla et al. "Recent advances in graphene based polymer composites" Progress in Polymer Science, 35, 2010, 1350-1375.*

Lin et al. "Preparation and characterization of covalent polymer functionalized graphene oxide" J. Mater. Chem. 2011, 21, 3455-3461.*

"Covalent functionalization of graphene with organosilane and its use as a reinforcement in epoxy composites"; Wang, X. et al., Composites Science and Technology 2012, vol. 72, pp. 737-743.

"Covalent polymer functionalization of graphene nanosheets and mechanical properties of composites", Fang, M. et al., Journal of Materials Chemistry 2009, vol. 19, pp. 7098-7105.

International Search Report and Written Opinion for PCT International Application No. PCT/US2013/034795 (published Nov. 14, 2013 as WO2013/169413) dated Jul. 12, 2013; 13 pgs. The instant application claims priority to PCT/US2013/034795.

* cited by examiner

POLYMER MATRICES FUNCTIONALIZED WITH CARBON-CONTAINING SPECIES FOR ENHANCED THERMAL CONDUCTIVITY

CROSS-REFERENCE TO RELATED APPLICATIONS

This application is a continuation of PCT International Application PCT/US2013/034795 filed Apr. 1, 2013 (published as WO 2013/169413 on Nov. 14, 2013), which in turn, claims priority to India Patent Application No. 1827/CHE/2012 filed May 9, 2012. The entire disclosures of the above applications are incorporated herein by reference.

FIELD

The present disclosure relates to polymer matrices functionalized with carbon-containing species for enhanced thermal conductivity.

BACKGROUND

This section provides background information related to the present disclosure which is not necessarily prior art.

Electronic components, such as semiconductors, transistors, etc., typically have pre-designed temperatures at which the electronic components optimally operate. Ideally, the pre-designed temperatures approximate the temperature of the surrounding air. But the operation of electronic components generates heat which, if not removed, will cause the electronic component to operate at temperatures significantly higher than its normal or desirable operating temperature. Such excessive temperatures may adversely affect the operating characteristics, lifetime, and/or reliability of the electronic component and the operation of the associated device.

To avoid or at least reduce the adverse operating characteristics from the heat generation, the heat should be removed, for example, by conducting the heat from the operating electronic component to a heat sink. The heat sink may then be cooled by conventional convection and/or radiation techniques. During conduction, the heat may pass from the operating electronic component to the heat sink either by direct surface contact between the electronic component and heat sink and/or by contact of the electronic component and heat sink surfaces through an intermediate medium or thermal interface material. The thermal interface material may be used to fill the gap between thermal transfer surfaces, in order to increase thermal transfer efficiency as compared to having the gap filled with air, which is a relatively poor thermal conductor. In some devices, an electrical insulator may also be placed between the electronic component and the heat sink, in many cases this is the thermal interface material itself.

SUMMARY

This section provides a general summary of the disclosure, and is not a comprehensive disclosure of its full scope or all of its features.

According to various aspects, exemplary embodiments are disclosed of thermally conductive composites that include a polymer matrix functionalized with a carbon-containing species covalently coupled with the polymer matrix. Also disclosed are methods that generally include functionalizing a carbon-containing species and incorporating the functionalized carbon-containing species into the polymer, such that the carbon-containing species are covalently bonded to the polymer matrix via a coupling agent.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure FIG. 1 illustrates an example of matrix functionalization.

Figure 7:
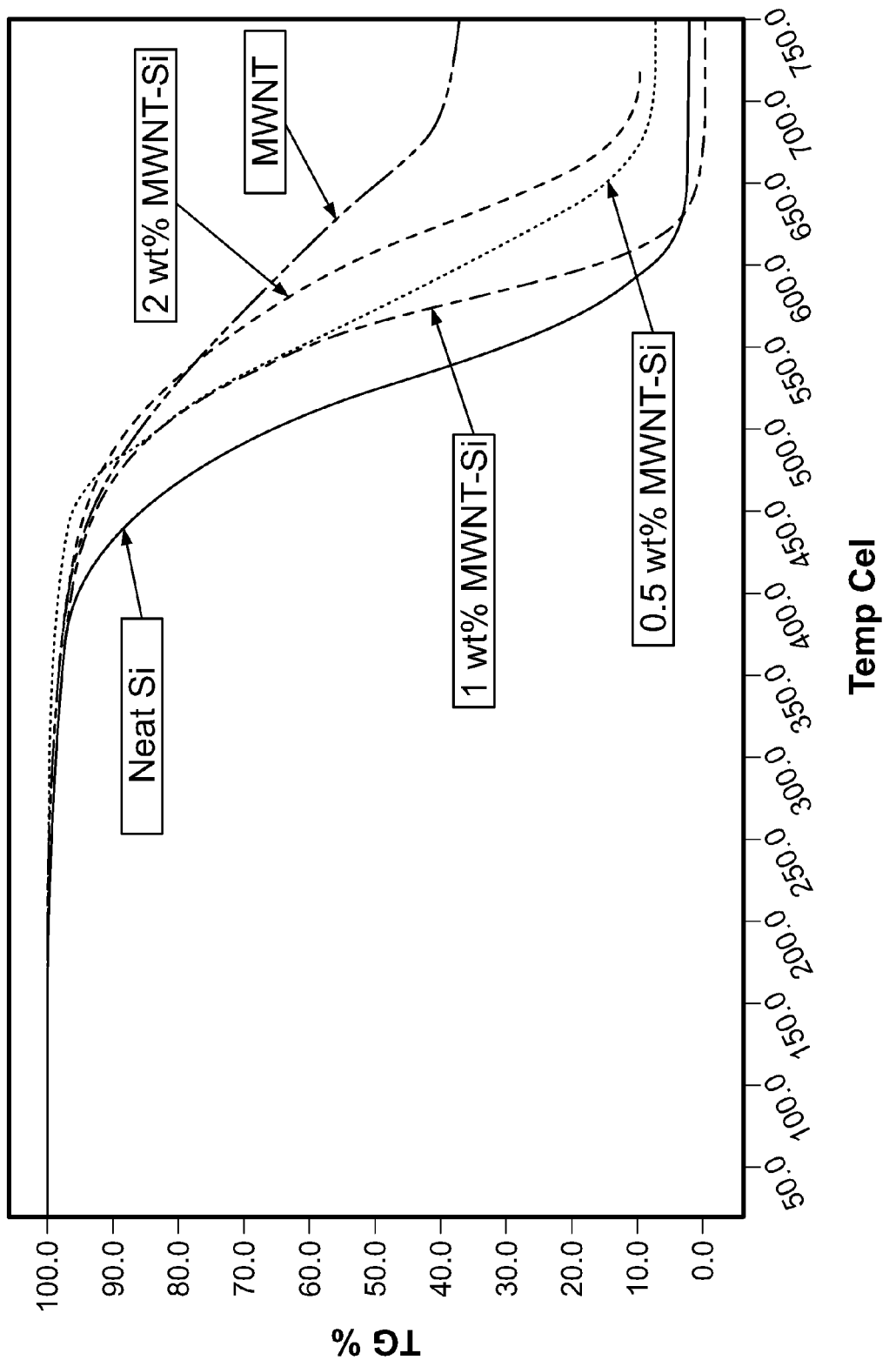

FIG. 7 is an exemplary line graph of percentage of thermal degradation versus temperature in degrees Celsius for exemplary nanocomposites with different weight percentages of vinyl functionalized multi-walled nanotubes in a polymer matrix in accordance with exemplary embodiments of the present technology and also for a nanocomposite including non-functionalized multi-walled nanotubes in a polymer matrix.

DETAILED DESCRIPTION

Example embodiments will now be described more fully with reference to the accompanying drawings.

The inventors hereof have recognized that higher thermal conductivities may be achieved for thermal interface materials (e.g., gap fillers, etc.) and other materials (e.g., thermally and/or electrically conductive plastics, etc.) by enhancing the thermal conductivity of the base matrix without having to further incorporate or increase the loading amount of thermally conductive filler in the matrix. Accordingly, the inventors have developed and disclose herein exemplary embodiments of polymer matrices functionalized with carbon-containing species that may be used, for example, with thermal interface materials, thermally and/or electrically conductive plastics, etc. Also disclosed herein are exemplary methods of enhancing thermal conductivity of a polymer matrix functionalizing a carbon-containing species and incorporating the functionalized carbon-containing species into the polymer, such that the carbon-containing species are covalently bonded to the polymer matrix via a coupling agent. This functionalization results in enhanced thermal conductivities of both the polymer matrix as well as the resulting thermally conductive composite formed from the enhanced polymer matrix. Accordingly, aspects of the present disclosure also relate to matrix enhancement by functionalizing carbon-containing species into the polymer of the matrix. The functionalized, thermally enhanced matrix may be used, for example, for thermal interface materials, thermally conductive plastics, thermally and/or electrically conductive plastics, etc.

In exemplary embodiments, the electrical conductivity of a thermally conductive composite is tunable based on the functionalization level. Accordingly, the thermally conductive composite may thus be electrically insulative or electrically conductive composites depending on the variation of the functionalization.

In exemplary embodiments, one or more carbon-containing species are covalently coupled (e.g., attached, bonded, etc.) with or to a polymer matrix, which enhances thermal conductivity while retaining electrical insulation properties such that the resulting composite is a dielectric or electrical insulator. In such exemplary embodiments, a polydimethylsiloxane (PDMS) chain is covalently attached to graphene nanoplatelets, graphene, or graphene oxide via a coupling agent (e.g., MPTMS (3-methacryloxypropyltrimethoxylsilane), etc.), which is part of the matrix. The percentage of the functionalized graphene in the polymer matrix may be between about 0.001 V % (volume percent) to about 5 V %. The functionalization molecule may be PDMS and/or derivatives of PDMS. By way of example, functionalization of a silicone matrix (see, e.g., FIG. 1, etc.) with graphene may improve thermal conductivity of the silicone matrix by about 20% to about 40%. The functionalized matrix may have electrical insulating properties.

Figure 1:
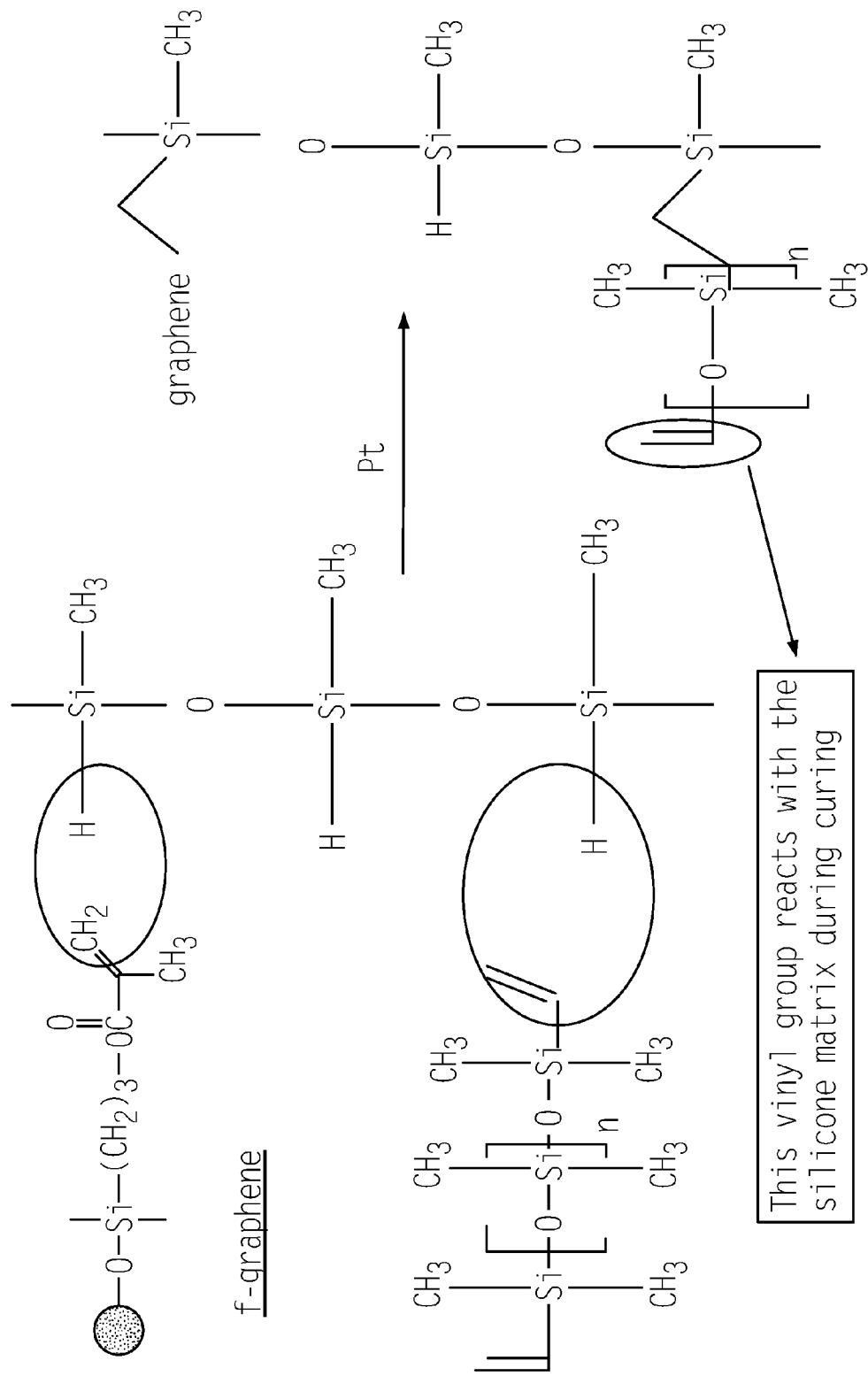
Figure 2:
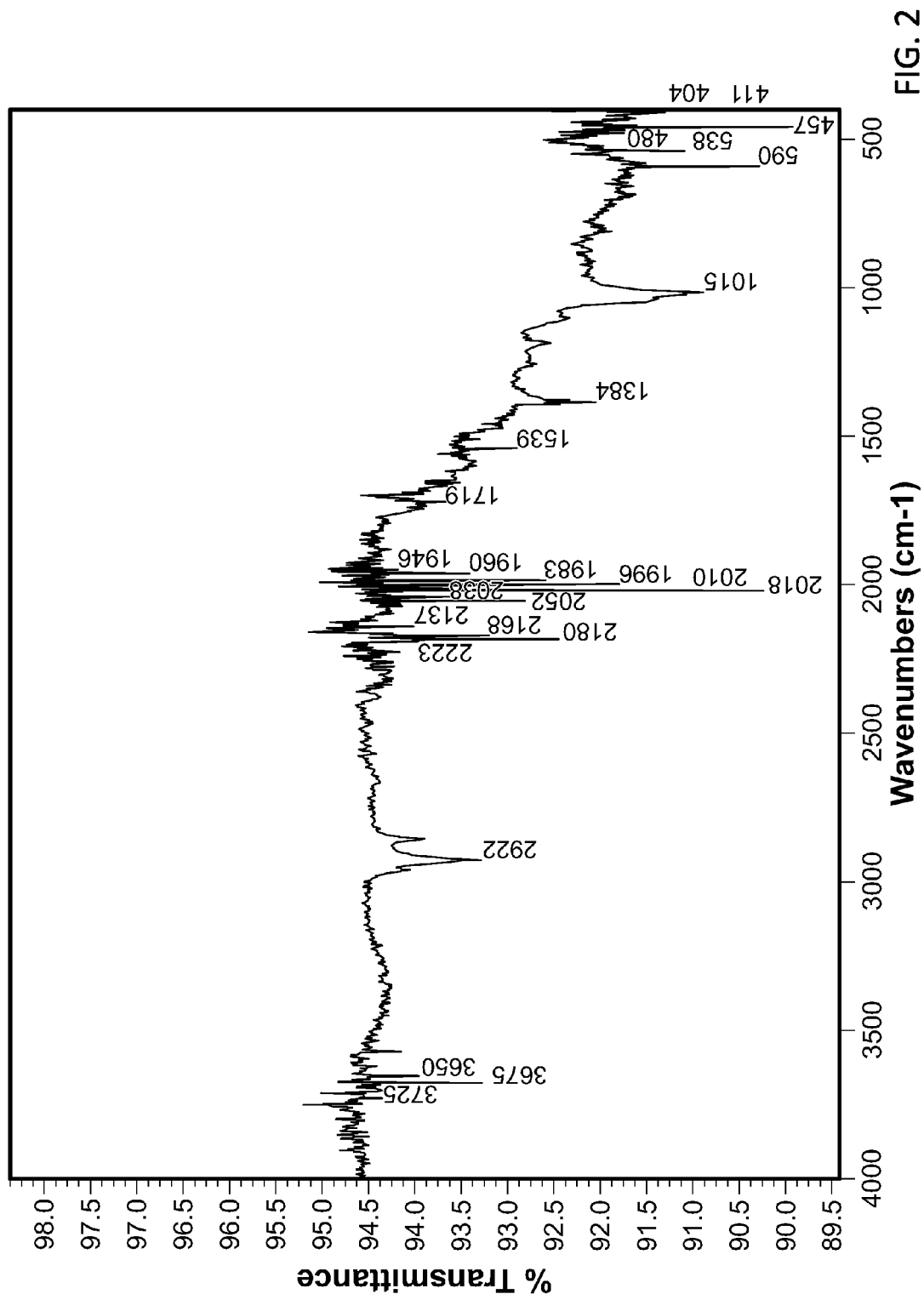
FIG. 2 is an FTIR (Fourier transfer infrared) spectra of functionalized graphene, wherein the peaks at 1384 and 1015 $cm^{-1}$ are indicative of the presence of silicone chains on the surface of graphene nanoplatelets.
Figure 3:
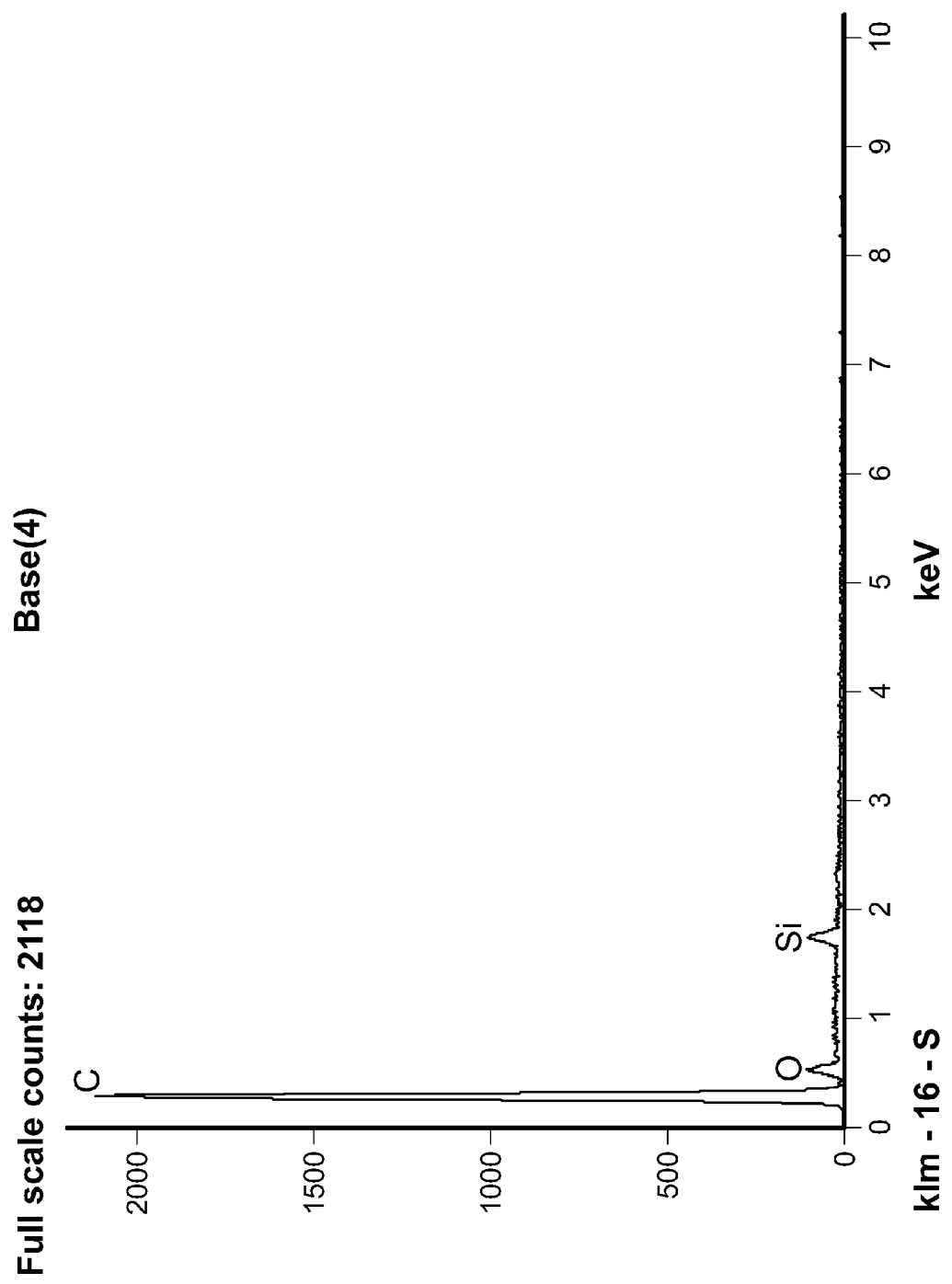
FIG. 3 is an EDS (energy-dispersive) spectra of functionalized graphene, which shows the presence of silicon, oxygen, and carbon in the functionalized graphene.
Figure 4:
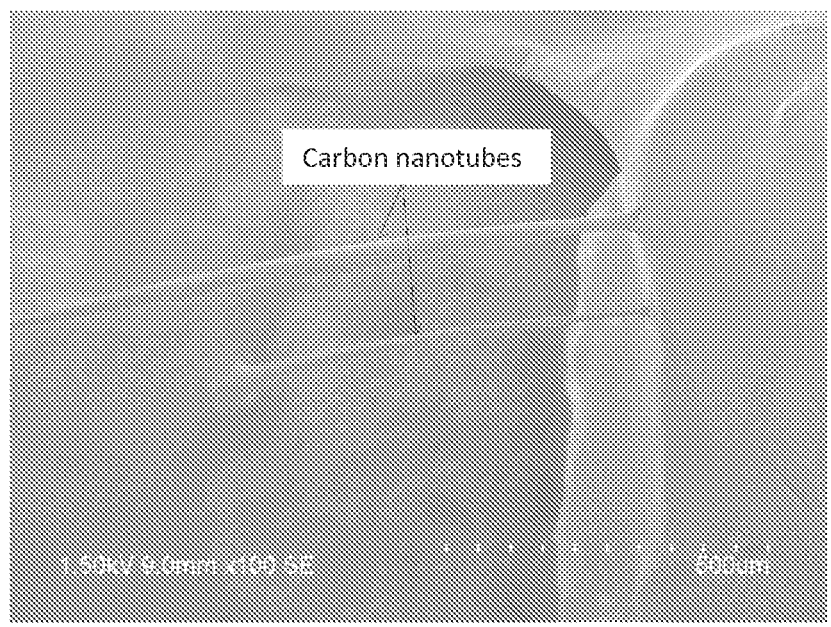
FIG. 4 is a scanning electron micrograph of functionalized carbon nanotube (CNT) polymer composite.

FIG. 1 illustrates an example of matrix functionalization and also identifying the vinyl group that reacts with the silicone matrix during curing. FIG. 2 is an FTIR (Fourier transfer infrared) spectra of functionalized graphene showing percent transmittance versus wave numbers. The peaks at 1384 cm$^{-1}$ and 1015 cm$^{-1}$ in FIG. 2 are indicative of the presence of silicone chains on the surface of graphene nanoplatelets. FIG. 3 is an EDS (energy-dispersive) spectra of functionalized graphene showing counts versus energy in kiloelectron volts (keV). The peaks in FIG. 3 show the presence of silicon, oxygen, and carbon in the functionalized graphene. FIG. 4 is a scanning electron micrograph of functionalized carbon nanotube (CNT) polymer composite.

In an exemplary embodiment, graphene nanoplatelets were functionalized by means of a reaction between the hydroxyl groups on the edges of the graphene nanoplatelets and a coupling agent 3-methacryloxypropyltrimethoxylsilane (MPTMS) via covalent bonding of O—Si group to incorporate double bonds on the surface of the graphene nanoplatelets. See figure immediately below representing the reaction between —OH groups on graphene edges and MPTMS.

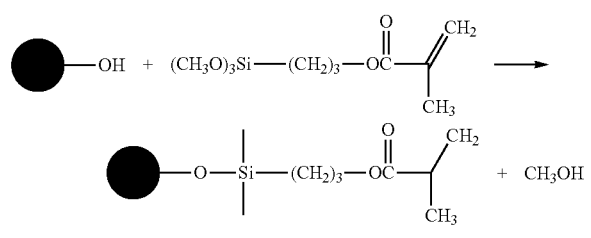

The double bonds on the surface of the graphene nanoplatelets were then reacted with the Si—H groups on the PDMS (polydimethylsiloxane) chains (e.g., present in the PDMS chains of Part B of a two-part silicone matrix, which may be a thermally curable silicone rubber from Dow Corning Corporation, Midland, Mich., United States of America, etc.) via a hydrosilation reaction in the presence of a platinum based (e.g., platinum-divinyltetramethylsiloxane) catalyst at 150° C. In other exemplary embodiments, the reaction temperature may be higher or lower than 150° C. such as within a range from room temperature (e.g., about 20° C. to 25° C., etc.) to about 200° C. See the figure immediately below representing the reaction between double bond on graphene surface (from MPTMS) and Si—H groups on PDMS chains. After this reaction, the PDMS chains are wrapped around the graphene platelets.

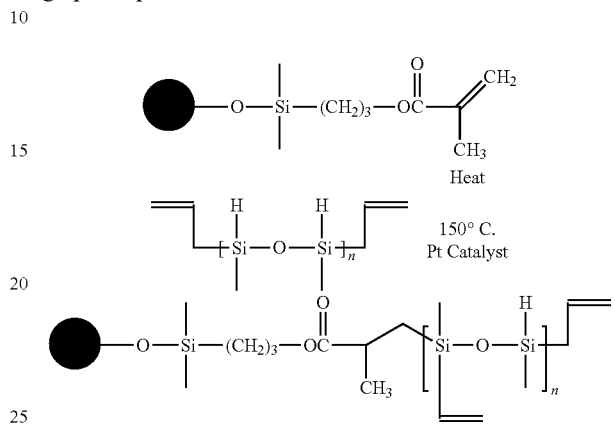

The PDMS functionalized graphene platelets were incorporated into a two-part silicone system (e.g., vinyl terminated PDMS chains (Part A) and PDMS chains (Part B) of two-part silicone system, etc.). The system was cured at 150° C. to obtain a silicone gel. During this curing reaction, the functionalized graphene platelets become a part of the siloxane network due to the reaction between the double bonds on the graphene surface and the Si—H groups in PDMS chains of Part B of the two-part silicone system. In other exemplary embodiments, the curing may include using ultraviolet radiation at room temperature. See the figure immediately below representing the curing reaction of the two-part silicone system along with PDMS-functionalized graphene.

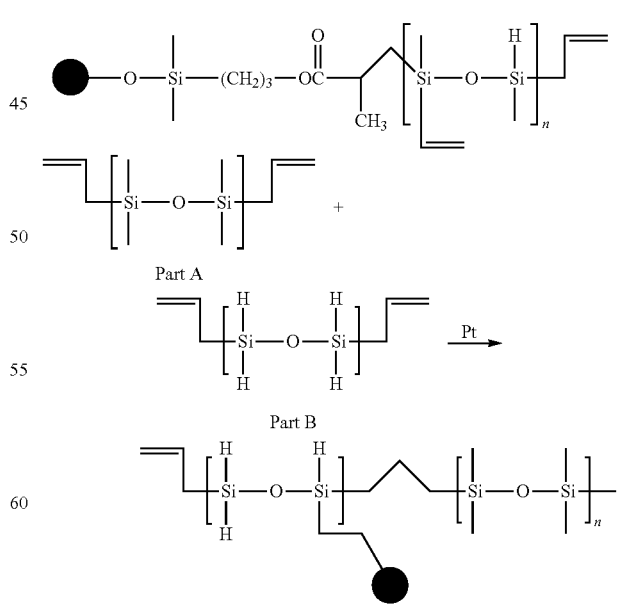

Introduction of PDMS chains on the graphene surface improves interfacial interaction between the graphene platelets and the surrounding silicone matrix. This, in turn, improves overall thermal conductivity of the polymer matrix.

Aspects of the present disclosure will be further illustrated by the following examples set forth in the tables herein for comparison. These examples (as are all examples provided herein) are merely illustrative, and do not limit this disclosure to the particular formulations in any way.

Various composites were prepared using boron nitride (BN) as a filler in a graphene functionalized polymer, which are set forth in the table below. Specifically, the table below sets forth the thermal conductivity, electrical resistivity, and stability for the following test specimens or samples. The first sample or test specimen included a pure silicone matrix, which was not functionalized with graphene or loaded with any thermally conductive filler. The second sample or test specimen included a functionalized silicone matrix with 3 wt % (weight percent) exfoliated graphene nanoplatelets (xGNP). The third sample or test specimen included a silicone matrix with 47 wt % boron nitride. The fourth sample or test specimen included a silicone matrix with 2 wt % exfoliated graphene nanoplatelets and 47 wt % boron nitride. The fifth sample or test specimen included a functionalized silicone matrix with 2 wt % exfoliated graphene nanoplatelets and 47 wt % boron nitride.

Generally, these test results show that in addition to improvement in thermal conductivity values (e.g., compare 2.8 W/m-K for samples 3 and 4 with 4 W/m-K for sample 5, etc.), the overall composite also remains electrically insulating despite the incorporation of 3 wt % of graphene into the matrix. The electrical insulation may be due to the partial coverage of the graphene nanoplatelets by the PDMS chains that have been anchored on their surfaces.

| Sample | Thermal Conductivity (W/m-K) | Electrical Resistivity (ohm-cm) | Stability |
|---|---|---|---|
| Pure silicone matrix | 0.14 | Insulating | gel |
| f-silicone matrix with xGNP (3 wt %) | 0.2 | Insulating | gel |
| Silicone matrix + 47 wt % BN | 2.8 | Insulating | paste-like |
| Silicone matrix + 2 wt % xGNP + 47 wt % BN | 2.8 | Insulating (higher than $10^8$ ohm-cm) | powdery |
| f-silicone matrix with xGNP (3 wt %) + 47 wt % BN | 4 | Insulating (higher than $10^8$ ohm-cm) | formable |

By way of further example, vinyl group functionalized multi-walled nanotubes (MWNTs) were prepared using a zwitterionic intermediate or inner salt, such as ammonioacetate (glycine), trimethylamine oxide, etc. The vinyl-MWNTs were incorporated into a silicone matrix at various weight percentages. During the curing reaction of the silicone, a siloxane network was formed on the surface of these MWNTs. Such functionalized MWNTs were found to improve the thermal properties (e.g., up to 23% improvement in thermal conductivity, etc.) and thermal stability (e.g., up to 539° C., etc.) of the polymer composites as compared to pure MWNTs. These improvements are expected to be due to better compatibilization of the MWNTs with the polymer matrix. In this example, the dispersion of the MWNTs in the polymer matrix was analyzed and studied using SEM (scanning electron microscope) technologies. Thermal properties were studied using thermogravimetric analyzer (TGA) and a Hot Disk calorimeter (for thermal conductivity measurements).

Continuing with this example, the host matrix was a two part silicone matrix, which is a thermally curable silicone rubber from Dow Corning Corporation, Midland, Mich., United States of America. It consists of two parts, vinyl-terminated PDMS chains (Part A) and PDMS chains (Part B). A final sample was obtained by a hydrosilation reaction between the Si—H groups on the PDMS chains in Part B and the terminal vinyl groups on the PDMS chains in Part A in the presence of the platinum based catalyst (e.g., platinum-divinyltetramethylsiloxane, etc.). The CNT/Silicone nanocomposites were obtained by using a solution processing method, which produces a good dispersion of the CNTs in the polymer matrix. The dispersion can be improved by chemical functionalization of the CNTs, leading to improved interfacial bonding between the CNTs and the polymer matrix.

The zwitterionic intermediate enables incorporation of a terminal vinyl group onto the surface of the CNTs. These functionalized CNTs can be mixed with the PDMS chains of Part B (containing polymer chains with Si—H groups) of the silicone matrix using a solvent processing method. After evaporation of the solvent used, the vinyl-terminated PDMS chains of Part A (containing catalyst) is added to this system. During the curing reaction, a hydrosilation reaction takes place between the double bonds incorporated on the surface of the CNTs and the Si—H groups present on the polymer chains in Part B along with the curing of the two parts of the polymer matrix (see figure immediately below). With this exemplary method, the CNTs are chemically bonded to the polymer chains via the hydrosilation reaction and become an integral part of the cross-linked polymer system.

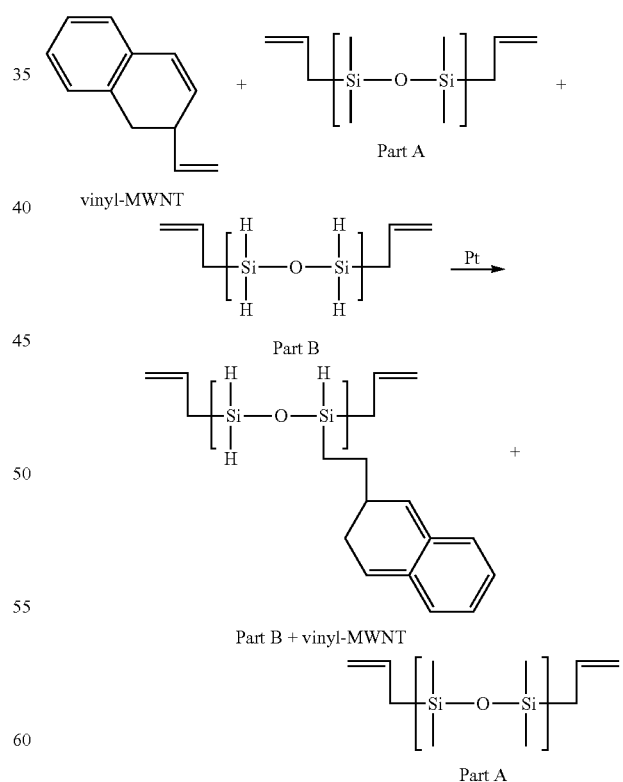

Disclosed herein are exemplary embodiments including CNT/Silicone nanocomposites with improved interfacial interactions between the CNTs and the polymer chains, which provides an improvement in the inherent thermal conductivity of the polymer matrix. Also, reinforcement using functionalized CNTs may also improve the thermal stability of the resulting composites. The inventors hereof have compared thermal conductivity and thermal stability of the composites made using both functionalized as well as non-functionalized CNTs in the polymer matrix. The inventors have observed that functionalization of the CNTs improves properties of the nanocomposite possibly due to better compatibilization with the host matrix.

In order to perform a comparison study how functionalized MWNTs improved thermal properties and thermal stability a polymer composite as compared to pure MWNTs, the inventors prepared an experimental or test specimens by the following exemplary process.

MWNTs were purified prior to use by washing them in 37% Hydrogen Chloride (HCl) at 60° C. for 4 hours. The MWNTs were also subject to centrifugation in a centrifugal machine, sonication in a solvent by a sonicator, and mixing in a paste mixer. Functionalization of the purified MWNTs was performed by reactions which were initiated by formation of a zwitterionic complex between DMAP (4-dimethylamino pyridine) and DMAD (dimethyl acetylene dicarboxylate). The zwitterionic moiety adds across the double bond present on the surface of the MWNT to form a charged intermediate. This charged intermediate can then be trapped by various nucleophiles, resulting in incorporation of different functional groups on the surface of the MWNTs. 0.014 millimoles (mmol) of MWNTs were taken in toluene (40 mL) and ultrasonicated for 5 minutes. This mixture was then heated along with stirring to a temperature of 60° C., followed by simultaneous addition of 0.036 mmol of DMAP in toluene (6 mL) and 0.028 mmol of DMAD. The addition of this mixture to the MWNT suspension was carried out over a period of 36 hours. An excess (0.5 mL) of 2-methyl-3-butene-2-ol was added to this reaction mixture, and the system was stirred for another 12 hours at 60° C. The final reaction mixture was then cooled to room temperature and centrifuged at 6000 rpm for 5 minutes. After discarding the supernatant, the residue was washed a couple of times with acetone. The final product was obtained after drying in an oven at 100° C. overnight.

The double bond functionalized vinyl-MWNTs (0.25, 0.5, 1 and 2 wt %) were mixed with PDMS chains of Part B of a two-part silicone matrix in a solvent. The system was stirred for 30 minutes prior to evaporation of the solvent. Then, Part A (containing the platinum-based catalyst) of the silicone matrix was added to the reaction mixture, and the system was stirred for 30 minutes. The mixture was kept in an oven for curing at 150° C. for 45 minutes. Nanocomposites were also prepared using non-functionalized MWNTs (1 wt %) in the silicone matrix using a similar method in order to have a control sample for purposes of comparison.

The thermal properties of the nanocomposites obtained by mixing of the pure-MWNTs as well as the vinyl-MWNTs were analyzed in detail. Thermal conductivity and thermal stability values were measured using various percentages (0.25, 0.5, 1 and 2 wt %) of the vinyl-MWNTs. A nanocomposite was prepared using 1 wt % of non-functionalized MWNTs, for purposes of comparison. As shown by the tables below, both thermal conductivity as well as thermal stability values exhibited a marked improvement in the presence of the vinyl-MWNTs as compared to the non-functionalized MWNTs.

Figure 5:
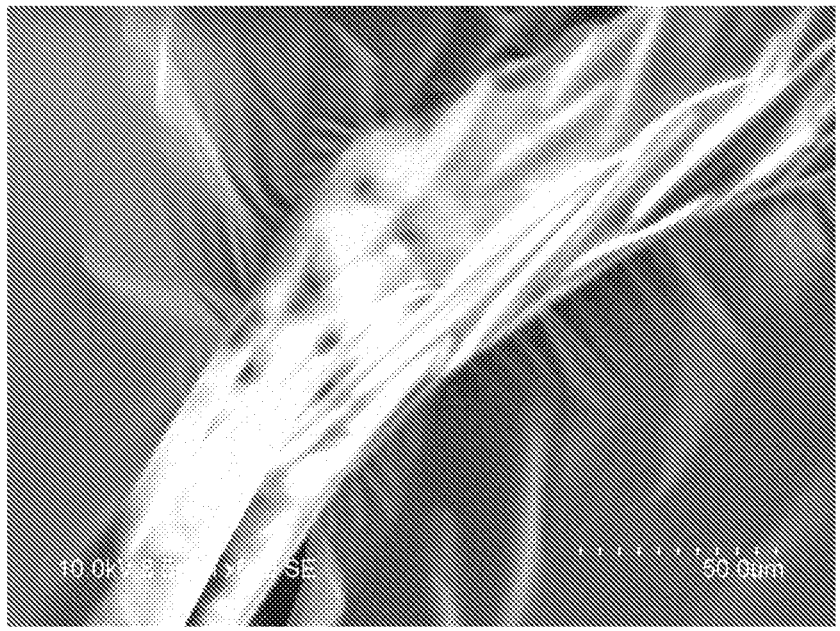
FIG. 5 is a scanning electron micrograph of a nanocomposite including non-functionalized multi-walled nanotubes in a polymer matrix.
Figure 6:
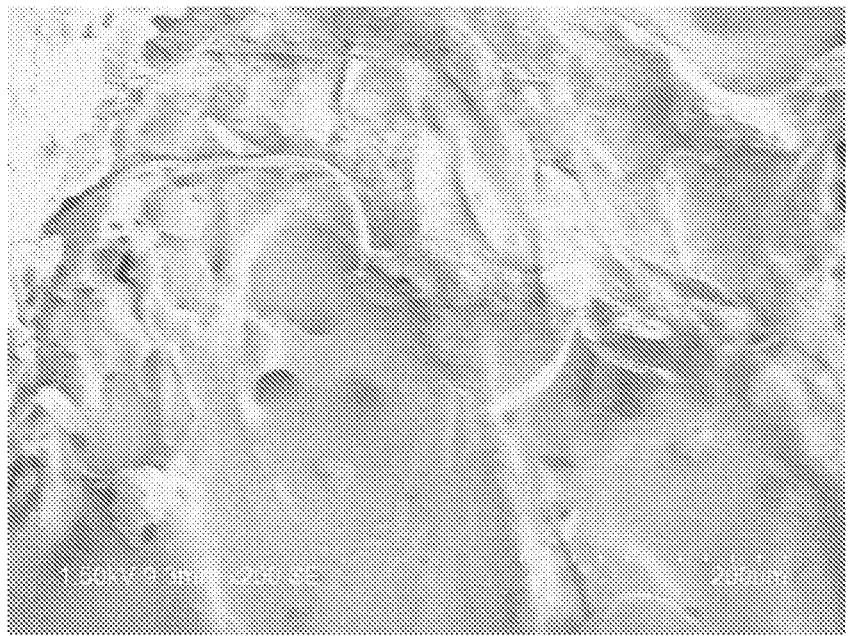
FIG. 6 is a scanning electron micrograph of a nanocomposite including vinyl functionalized multi-walled nanotubes in a polymer matrix according to exemplary embodiments of the present technology.

As shown by a comparison of FIGS. 5 and 6, there is an improved dispersion of the vinyl-MWNTs (FIG. 6) (1 wt % loading in the matrix) in the polymer matrix while some MWNT bundles were observed in the nanocomposites prepared using 1 wt % of the non-functionalized MWNTs (FIG. 5). The improved dispersion of the functionalized MWNTs was expected due to improved compatibility of the vinyl-MWNTs with the silicone matrix. This compatibility is primarily due to the formation of the siloxane network obtained due to curing of the two parts (Parts A and B) of the silicone matrix in the presence of the Platinum-based catalyst. The vinyl group present on the vinyl-MWNTs also participates in this cross-linking reaction leading to the formation of the siloxane network on the MWNT surfaces.

| Sample | Thermal Conductivity (W/m-K) | Percentage Increase |
|---|---|---|
| Silicone | 0.14 | — |
| Silicone + pure MWNT (1 wt %) | 0.16 | 14.2% |
| Silicone + vinyl-MWNT (0.25 wt %) | 0.151 | 11% |
| Silicone + vinyl-MWNT (0.5 wt %) | 0.157 | 12.1% |
| Silicone + vinyl-MWNT (1 wt %) | 0.172 | 23% |

As shown by the table above, thermal conductivity of the nanocomposites increase with the increase in the amount of the MWNTs added to the system. For example, with only 1 wt % of vinyl-MWNTs, the thermal conductivity of the polymer matrix showed a 23% improvement over that of the pure silicone matrix, as compared to a 14.2% improvement observed when 1 wt % of pure-MWNTs were used in the polymer nanocomposite. This large improvement in the thermal conductivity of the nanocomposite can be attributed to the improved compatibility of the vinyl-MWNTs in the silicone matrix due to formation of the siloxane network on the MWNT surfaces.

Thermal stability of the prepared nanocomposites was also measured using a thermogravimetric analyzer (TGA). FIG. 7 is an exemplary line graph of percentage of thermal degradation versus temperature in degrees Celsius for various nanocomposites with different weight percentages or amounts of loading of the vinyl-MWNTs in a polymer matrix. FIG. 7 also illustrates the percent thermal degradation for a nanocomposite (labeled neat Si FIG. 7) including non-functionalized multi-walled nanotubes in a polymer matrix. The thermal stability values are summarized in the table immediately below. A continuous increase in thermal stability of the nanocomposites was observed as the amount of vinyl-MWNTs increased in the polymer matrix.

| Sample Name | Thermal stability (° C.) |
|---|---|
| Silicone | 467.8 |
| Silicone + vinyl-MWNT (0.5 wt %) | 469.5 |
| Silicone + vinyl-MWNT (1 wt %) | 524.7 |
| Silicone + pure MWNT (1 wt %) | 515.0 |
| Silicone + vinyl-MWNT (2 wt %) | 539.4 |

Accordingly, the inventors hereof have disclosed exemplary embodiments in which MWNTs were effectively functionalized by using zwitterionic intermediates in order to introduce vinyl groups onto the surface of the MWNTs. This was observed to improve properties of the resultant nanocomposites due to the hydrosilation reaction between the vinyl groups on the surface of the MWNTs and the Si—H groups present in the PDMS chains of Part B of the two-part silicone system in the presence of the hydrosilation catalyst present in the vinyl-terminated PDMS chains of Part A of the silicone system. In the example just described, this hydrosilation reaction occurred simultaneously during curing of the two parts of the silicone matrix at 150° C. Chemical bonding of the MWNTs onto the polymer chains improved the dispersion of the MWNTs in the host matrix, thus leading to improvements in the thermal conductivity as well as thermal stability of the resultant nanocomposites. Comparison studies were also carried out using non-functionalized MWNTs in these polymer matrices, which studies revealed that the use of the vinyl functionalized MWNTs improved properties over use of regular MWNTs. As disclosed herein, formation of the siloxane network on the surface of the MWNTs improved their dispersion in the matrix, thus improving properties. The resultant composites exhibit improved thermal properties at very low levels of vinyl functionalized MWNT loading.

In exemplary embodiments, the carbon-containing species and the matrix may comprise a wide range of materials. By way of example, the carbon-containing species may comprise graphene, graphene nanoplatelets, exfoliated graphene nanoplatelets (xGNP), graphene oxide, carbon nanotubes (CNTs), multi-walled carbon nanotubes (MWNTs), single-walled carbon tubes (SWTs), among other suitable carbon-containing species, etc. Also by way of example, the matrix may comprise a two-part silicone matrix including polydimethylsiloxane (PDMS) available from Dow Corning Corporation, Midland, Mich., United States of America, etc. As another example, the matrix may comprise epoxy, such as an epoxide or other epoxy compound. As used herein, the term "epoxy" generally refers to and includes compounds in which an oxygen atom is directly attached to two adjacent or non-adjacent carbon atoms of a carbon chain or ring system, thus cyclic ethers. The term epoxides represents a subclass of epoxy compounds containing a saturated three-membered cyclic ether; thus oxirane derivatives, e.g., 1,2-epoxypropane, or 2-methyloxirane (an epoxide); 9,10-epoxy-9,10-dihydroanthracene (an epoxy compound).

Other suitable polymeric organosilicon compounds and polymers may also be used for the matrix, such as elastomers, natural rubbers, synthetic rubbers, ethylene-propylene diene monomer (EPDM) rubber, fluorosilicone, isoprene, nitrile, chlorosulfonated polyethylene, neoprene, fluoroelastomer, urethane, thermoplastic elastomer (TPE), polyimide TPE and thermoplastic polyurethane (TPU), acrylonitrile butadiene styrene (ABS) (chemical formula $(C_8H_8.C_4H_6.C_3H_3N)_n$), polycarbonate/acrylonitrile butadiene styrene alloys (PC-ABS), polybutylene terephthalate, polyphenylene oxide, polyphthalamidepolyphenylene sulfide) (PPS), polyphenylene ether, modified polyphenylene ether containing polystyrene, liquid crystal polymers, polystyrene, styrene-acrylonitrile copolymer, rubber-reinforced polystyrene, poly ether ether ketone (PEEK), acrylic resins, polymers and copolymers of alkyl esters of acrylic and methacrylic acid styrene-methyl methacrylate copolymer, styrene-methyl methacrylate-butadiene copolymer, polymethyl methacrylate, methyl methacrylate-styrene copolymer, polyvinyl acetate, polysulfone, polyether sulfone, polyether imide, polyarylate, polyamideimide, polyvinyl chloride, vinyl chloride-ethylene copolymer, vinyl chloride-vinyl acetate copolymer, polyimides, polyamides, polyolefins, polyethylene, ultra high molecular weight polyethylene, high density polyethylene, linear low density polyethylene, polyethylene napthalate, polyethylene terephthalate, polypropylene, chlorinated polyethylene, ethylene acrylic acid copolymers, nylon, nylon 6, nylon 6,6, phenylene oxide resins, phenylene sulfide resins, polyoxymethylenes, polyesters, polyvinyl chloride, vinylidene chloride/vinyl chloride resins, vinyl aromatic resins, polystyrene, poly(vinylnaphthalene), poly(vinyltoluene), polyaryletheretherketone, polyphthalamide, polyaryletherketone, polycarbonate, polyphenylene, or combinations thereof.

Thermally conductive polymer composites disclosed herein may be used in a wide range of applications, such as thermal interface materials. For example, thermal interface materials may include a polymer matrix functionalized with carbon-containing species, such as graphene, graphene nanoplatelets, graphene oxide, carbon nanotubes (CNTs), multi-walled carbon nanotubes (MWNTs), single-walled carbon nanotubes (SWTs), among other suitable carbon-containing species, etc. This functionalization improves or enhances thermal conductivity of the matrix as well as the thermal conductivity of the thermal interface material including the matrix. In addition, the thermal interface material may also be dielectric or electrically insulating despite the carbon-containing species. In such embodiments, a thermal interface material may also be referred to as a thermally conductive dielectric or thermally conductive electrical insulator.

In some preferred exemplary embodiments, the matrix material is selected so that the resulting thermal interface material will be conformable to one or more surfaces, such as opposing surfaces of a heat transfer device (e.g., heat sink, etc.) and electronic component (e.g., PCB-mounted electronic component, etc.). In such embodiments, a conformable or compliant thermal interface material including a polymer matrix functionalized with carbon-containing species may have a sufficiently low modulus of elasticity (e.g., less than $10^6$ Pascals as determined by ASTM D5934-02, etc.) to conform to surfaces under normal operating pressures and temperature of e.g., electronic components. This conformability of the thermal interface material helps to eliminate, minimize, or at least reduce air gaps or voids when the thermal interface material is between opposing surfaces. This, in turn, increases thermal transfer efficiency as the thermal interface material is a better thermal conductor than gaps filled with air. By way of example, exemplary embodiments of a thermal interface material including a polymer matrix functionalized with carbon-containing species may have characteristics or properties similar or identical to thermal interface materials available from Laird Technologies, Inc., such as Tflex™, Tpli™, and Tputty™ gap filler products, etc. By way of further example, a thermal interface material including a polymer matrix functionalized with carbon-containing species may be configured so that it will deflect to a percentage (e.g., within a range from about 25% to about 50%, etc.) of its original thickness at a pressure of 50 pounds per square inch. This high rate of compliancy allows the thermal interface material to blanket or cover a surface thereby enhancing thermal transfer. The thermal interface material may have a very low compression set enabling it to be reused many times and/or may recover to 90% of its original thickness after compression under low pressure and/or may have a hardness of 70, 50, 45, 40, 35, 25, or 20 Shore 00 as determined by ASTM D2240.

In exemplary embodiments, one or more thermally conductive fillers may be added to the polymer matrix to further improve or enhance thermal conductivity. Exemplary thermally conductive fillers include metal particles, ceramic particles, carbon-containing species (e.g., graphite, graphene, carbon nanotubes, etc.) fibers that are compliant or conformable, boron nitride, aluminum, aluminum oxide, alumina trihydrate, zinc oxide, combinations thereof, etc. In some preferred embodiments, the thermally conductive fillers have a thermal conductivity of at least 1 W/m-K (Watts per meter Kelvin) or more, such as a copper filler having thermally conductivity up to several hundred W/mK, etc. In addition, exemplary embodiments of a thermal interface material may also include different grades (e.g., different sizes, different purities, different shapes, etc.) of the same (or different) thermally conductive fillers. For example, a thermal interface material may include two different sizes of boron nitride. By varying the types and grades of thermally conductive fillers, the final characteristics of the thermal interface material (e.g., thermal conductivity, cost, hardness, etc.) may be varied as desired.

Even though thermally conductive fillers may be added, this is not required for all embodiments as alternative embodiments may include thermally conductive composite materials and thermal interface materials without any thermally conductive fillers. In some embodiments, fillers may be distributed in a thermal interface material in a manner such that the fillers contact each other, which may enhance the ability of the thermal interface material to conduct heat, for example, in the Z axis direction.

With the higher thermal conductivity of the polymer matrix with the functionalized carbon-containing species, a thermal interface material including the polymer matrix may thus have a higher thermal conductivity with a lower amount of the thermally conductive filler loading. By way of example only, a thermal interface material including thermally conductive fillers and functionalized graphene in a polymer matrix may have a thermal conductivity of 8 Watts per meter per Kelvin (W/m-K) or more. Alternative embodiments of a thermal interface material may have a thermal conductivity higher or lower than 8 W/m-K (e.g., 1 W/m-K, 1.1 W/m-K, 1.2 W/m-K, 2.8 W/m-K, 3 W/m-K, 4 W/m-K, 5 W/m-K, 6 W/m-K, etc.) depending on the particular materials used to make the thermal interface material and loading percentage of the thermally conductive filler, if any.

A wide variety of fillers and/or additives may be added to achieve various desired outcomes. Examples of other fillers that may be added include pigments, plasticizers, process aids, flame retardants, extenders, electromagnetic interference (EMI) or microwave absorbers, electrically-conductive fillers, magnetic particles, etc. For example, tackifying agents, etc. may be added to increase the tackiness of a thermal interface material, etc. As another example, EMI or microwave absorbers, electrically-conductive fillers, and/or magnetic particles may be added such that a thermal interface material is also operable or usable as an electromagnetic interference (EMI) and/or radio frequency interference (RFI) shielding material. A wide range of materials may be added to a thermal interface material, such as carbonyl iron, iron silicide, iron particles, iron-chrome compounds, metallic silver, carbonyl iron powder, SENDUST (an alloy containing 85% iron, 9.5% silicon and 5.5% aluminum), permalloy (an alloy containing about 20% iron and 80% nickel), ferrites, magnetic alloys, magnetic powders, magnetic flakes, magnetic particles, nickel-based alloys and powders, chrome alloys, and any combinations thereof. Other embodiments may include one or more EMI absorbers formed from one or more of the above materials where the EMI absorbers comprise one or more of granules, spheroids, microspheres, ellipsoids, irregular spheroids, strands, flakes, powder, and/or a combination of any or all of these shapes.

Advantageously, thermally conductive polymer composites disclosed herein may have high thermal conductivity, good deflection properties, and good electrical insulation properties. Thermally conductive polymer composites disclosed herein may have higher thermal conductivities at lower amounts of thermally conductive filler loadings, while retaining the desired deflection properties as well as the electrical insulation properties. In an exemplary embodiment, this is achieved by functionalizing a polymer matrix with 3 wt % (weight percent) of PDMS-functionalized graphene. In this example, the anchoring of the PDMS chains onto the surface of the graphene results in electrical insulation of the polymer matrix despite the presence of the electrically-conductive graphene.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.), and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A material comprising a polymer matrix functionalized with a carbon-containing species covalently coupled with the polymer matrix, wherein the carbon-containing species is covalently bonded to the polymer matrix via a coupling agent that is part of the polymer matrix, and the polymer matrix comprises a two-part silicone matrix including a first part operable as the coupling agent and a second part operable as a functionalization molecule;
   wherein the polymer matrix includes at least one thermally conductive filler; and/or
   wherein the functionalization of the polymer matrix improves thermal conductivity of the polymer matrix by at least 11%.

2. The material of claim 1, wherein
   the carbon-containing species has at least one dimension less than 100 nanometers.

3. The material of claim 1, wherein:
   the functionalization molecule comprises polydimethylsiloxane (PDMS) or a derivative thereof; and/or
   polydimethylsiloxane (PDMS) chains are covalently attached to the carbon-containing species.

4. The material of claim 1, wherein the carbon-containing species comprises graphene nanoplatelets.

5. The material of claim 1, wherein:
   the functionalization of the polymer matrix with the functionalized carbon-containing species enhances thermal conductivity of the polymer matrix while retaining electrical insulation properties such that the functionalized polymer matrix is thermally conductive and dielectric; and/or
   the functionalization of the polymer matrix with the functionalized carbon-containing species enhances thermal conductivity without having to increase a loading amount of thermally conductive filler in the polymer matrix.

6. The material of claim 1, wherein:
   the functionalization of the polymer matrix improves thermal conductivity of the polymer matrix by about 20% to about 40%; and/or
   the material has a thermal conductivity of 4 Watts per meter Kelvin or more; and/or
   the material further comprises at least one thermally conductive filler in the functionalized polymer matrix, to thereby enhance thermal conductivity.

7. The material of claim 1, wherein electrical conductivity is selectively tunable based on functionalization level such that the material is electrically insulative or electrically conductive.

8. A thermally conductive material comprising the material of claim 1 and at least one thermally conductive filler in the polymer matrix, wherein the thermally conductive material comprises a thermal interface material, a thermally conductive composite, and/or a conformable thermal interface material suitable for use to fill a gap between at least two surfaces to transfer heat between the at least two surfaces.

9. A material comprising a polymer matrix functionalized with a carbon-containing species covalently coupled with the polymer matrix, wherein the carbon-containing species is covalently bonded to the polymer matrix via a coupling agent that is part of the polymer matrix, wherein the polymer matrix is prepared from 3-methacryloxypropyltrimethoxysilane (MPTMS) and polydimethylsiloxane (PDMS).

10. The material of claim 9, wherein:
   the carbon-containing species is covalently bonded to the polymer matrix via the MPTMS; and/or
   the PDMS is operable as a functionalization molecule.

11. The material of claim 9, wherein PDMS chains are covalently attached to the carbon-containing species.

12. A material comprising a polymer matrix functionalized with a carbon-containing species covalently coupled with the polymer matrix, wherein the carbon-containing species is covalently bonded to the polymer matrix via a coupling agent that is part of the polymer matrix, wherein the polymer matrix is functionalized with 3 wt % (weight percent) of PDMS-functionalized graphene, whereby anchoring of the PDMS chains onto the surface of the graphene retains dielectric and electrical insulation properties of the functionalized polymer matrix.

13. A material comprising a polymer matrix functionalized with a carbon-containing species covalently coupled with the polymer matrix, wherein the carbon-containing species is covalently bonded to the polymer matrix via a coupling agent that is part of the polymer matrix, wherein:
the carbon-containing species comprises exfoliated graphene nanoplatelets; and
the polymer matrix comprises a silicone matrix functionalized with the exfoliated graphene nanoplatelets and including at least one thermally conductive filler.

14. The material of claim 13, wherein the functionalized silicone matrix includes 2 wt % (weight percent) exfoliated graphene nanoplatelets and 47 wt % (weight percent) boron nitride.

15. A method of enhancing thermal conductivity of a polymer matrix, the method comprising functionalizing a carbon-containing species and incorporating the functionalized carbon-containing species into the polymer matrix, such that the carbon-containing species are covalently bonded to the polymer matrix via a coupling agent that is part of the polymer matrix, and the polymer matrix comprises a two-part silicone matrix including a first part operable as the coupling agent and a second part operable as a functionalization molecule;
wherein the polymer matrix includes at least one thermally conductive filler; and/or
wherein the functionalization of the polymer matrix improves thermal conductivity of the polymer matrix by at least 11%.

16. The method of claim 15, wherein the carbon-containing species comprises graphene nanoplatelets.

17. A method of enhancing thermal conductivity of a polymer matrix, the method comprising functionalizing a carbon-containing species and incorporating the functionalized carbon-containing species into the polymer matrix, such that the carbon-containing species are covalently bonded to the polymer matrix via a coupling agent, wherein:
the carbon-containing species comprises graphene nanoplatelets; and
the method includes:
functionalizing the graphene nanoplatelets by a reaction between hydroxyl groups on edges of the graphene nanoplatelets and the coupling agent via covalent bonding to incorporate double bonds on the surface of the graphene nanoplatelets; and
reacting the double bonds on the surface of the graphene nanoplatelets.

18. The method of claim 17, wherein the method includes incorporating the functionalized graphene nanoplatelets into the polymer matrix and curing the polymer matrix and functionalized graphene nanoplatelets.

19. The method of any one of claim 18, wherein the curing includes using ultraviolet radiation at room temperature.

20. The method of claim 17, wherein the reacting of the double bonds on the surface of the graphene nanoplatelets occurs at a temperature ranging from room temperature to 200° C.

21. The method of claim 17, wherein the method includes:
functionalizing the graphene nanoplatelets by means of a reaction between hydroxyl groups on edges of the graphene nanoplatelets and the coupling agent via covalent bonding of O—Si group to incorporate double bonds on the surface of the graphene nanoplatelets; and
reacting the double bonds on the surface of the graphene nanoplatelets with the Si—H groups on functionalization molecules.

22. The method of claim 17, wherein:
the polymer matrix comprises 3-methacryloxypropyltrimethoxylsilane (MPTMS) and polydimethylsiloxane (PDMS);
the method includes:
functionalizing the graphene nanoplatelets by means of a reaction between hydroxyl groups on edges of the graphene nanoplatelets and the MPTMS via covalent bonding of O—Si group to incorporate double bonds on the surface of the graphene nanoplatelets; and
reacting the double bonds on the surface of the graphene nanoplatelets with the Si—H groups on PDMS chains via a hydrosilation reaction in the presence of a platinum based catalyst at a sufficient temperature, whereby the PDMS chains are wrapped around the graphene nanoplatelets.

23. The method of claim 22, wherein the method includes incorporating the PDMS functionalized graphene nanoplatelets into the polymer matrix and curing the polymer matrix and PDMS functionalized graphene nanoplatelets to obtain a gel.

24. The method of claim 23, wherein during the curing, the PDMS functionalized graphene nanoplatelets become a part of the siloxane network due to a reaction between the double bonds on the graphene surface and the Si—H groups of the polydimethylsiloxane (PDMS) of polymer matrix.

25. The method of claim 23, wherein:
the hydrosilation reaction occurs at a temperature of 150° C.; and/or
the curing occurs at a temperature of 150° C.

\* \* \* \* \*

UNITED STATES PATENT AND TRADEMARK OFFICE
CERTIFICATE OF CORRECTION

PATENT NO. : 9,260,646 B2  
APPLICATION NO. : 14/493797  
DATED : February 16, 2016  
INVENTOR(S) : Sumana Roy Chowdhury et al.

Page 1 of 1

It is certified that error appears in the above-identified patent and that said Letters Patent is hereby corrected as shown below:

On the title page item 30, should read

FOREIGN APPLICATION PRIORITY DATA

May 9, 2012 (IN) ................... 1827/CHE/2012

Signed and Sealed this  
Tenth Day of May, 2016

Michelle K. Lee  
*Director of the United States Patent and Trademark Office*